(12) United States Patent
Huggett (10) Patent No.: US 8,270,478 B2
(45) Date of Patent: Sep. 18, 2012

(54) METHOD AND APPARATUS FOR COMPUTING A SLIDING SUM OF ABSOLUTE DIFFERENCES

(75) Inventor: Anthony Richard Huggett, Basingstoke (GB)

(73) Assignee: Ericsson AB, Stockholm (SE)

( * ) Notice: Subject to any disclaimer, the term of this patent is extended or adjusted under 35 U.S.C. 154(b) by 919 days.

(21) Appl. No.: 12/295,457

(22) PCT Filed: Mar. 29, 2007

(86) PCT No.: PCT/GB2007/001130
§ 371 (c)(1),
(2), (4) Date: Oct. 28, 2008

(87) PCT Pub. No.: WO2007/113491
PCT Pub. Date: Oct. 11, 2007

(65) Prior Publication Data
US 2010/0202518 A1    Aug. 12, 2010

(30) Foreign Application Priority Data
Mar. 31, 2006 (GB) .................................. 0606574.2

(51) Int. Cl.
*H04N 11/12* (2006.01)

(52) U.S. Cl. ............................. 375/240.11; 375/240.13

(58) Field of Classification Search ............. 375/240.12, 375/240.1, 240.11, 240.13
See application file for complete search history.

(56) References Cited

U.S. PATENT DOCUMENTS

| | | | | |
|---|---|---|---|---|
| 6,014,181 A * | 1/2000 | Sun | ................................ | 348/699 |
| 6,154,492 A * | 11/2000 | Araki et al. | ............... | 375/240.16 |
| 7,236,523 B2 * | 6/2007 | Guevorkian et al. | ...... | 375/240.12 |
| 7,236,632 B2 * | 6/2007 | Erol et al. | ...................... | 382/218 |
| 7,263,205 B2 * | 8/2007 | Lev | ................................ | 382/100 |
| 7,394,938 B2 * | 7/2008 | Erol et al. | ...................... | 382/218 |
| 7,508,954 B2 * | 3/2009 | Lev | ................................ | 382/100 |
| 7,539,275 B2 * | 5/2009 | Ray | ................................ | 375/349 |
| 7,697,608 B2 * | 4/2010 | Lee | ........................... | 375/240.03 |
| 7,756,292 B2 * | 7/2010 | Lev | ................................ | 382/100 |
| 2003/0043911 A1 * | 3/2003 | Guevorkian et al. | ...... | 375/240.12 |
| 2004/0062308 A1 * | 4/2004 | Kamosa | ................... | 375/240.16 |
| 2006/0023959 A1 * | 2/2006 | Yang et al. | ..................... | 382/238 |

FOREIGN PATENT DOCUMENTS

| | | |
|---|---|---|
| EP | 1538842 A2 | 6/2005 |
| WO | 98/18073 | 4/1998 |

* cited by examiner

*Primary Examiner* — Eleni Shiferaw
*Assistant Examiner* — Abu Sholeman
(74) *Attorney, Agent, or Firm* — Coats & Bennett, P.L.L.C.

(57) ABSTRACT

A logic circuit is configured to calculate a sliding sum of absolute differences of a plurality of numbers from a plurality of members respectively selected successively from all members of a sequence of numbers. The logic circuit reduces an amount of logic that is required to perform the sum of absolute differences, and thereby saves resources and latency.

14 Claims, 6 Drawing Sheets

METHOD AND APPARATUS FOR COMPUTING A SLIDING SUM OF ABSOLUTE DIFFERENCES

CROSS-REFERENCE TO RELATED APPLICATIONS

This application claims priority from GB 0606574.2, which was filed on Mar. 31, 2006, and is a national phase application of PCT application PCT/GB2007/001130, which is entitled "Method and Apparatus for Computing a Sliding Sum of Absolute Differences," which was filed Mar. 29, 2007. Both of these applications are incorporated herein by reference in their entirety.

TECHNICAL FIELD

This invention relates to a method and apparatus for computing a sliding sum of absolute differences.

BACKGROUND

In a digital video format, images are usually compressed for transmission and storage. Often sequential images in the video sequence differ only slightly. The difference from a previous, or following, image in the sequence can then be detected and encoded, rather than the entire picture. Such lossy compression techniques are widely used, such as in MPEG encoding.

During compression or encoding, each frame or image is divided into a grid of macroblocks, each containing 16×16 pixels. A macroblock from a current picture is compared to a range of macroblocks in a previous picture in the video sequence. Often a match or near-match is found at a different location. The difference in locations is known as a motion vector, since it indicates the movement of the macroblock between the two pictures. The motion vector rather than the entire macroblock can then be encoded for the new picture, saving storage space or transmission bandwidth.

Within the context of video encoding, it is often desirable, particularly within a motion estimator, to calculate a sum of absolute differences (SAD) between sets of pixels, one of which comprises a macroblock, or a partition thereof, the other set comprising reference data, when searching in a preceding frame for a matching macroblock.

For the purposes of illustration a 4×4 macroblock is considered herein in which the elements of a 4×4 macroblock are compared line by line with each overlapping 4×4 block of pixels in another frame. In general a 16×16 macroblock may be divided into 8×8 partitions which are subdivided into 4×4 sub-partitions.

In a known method, in order to locate a matching macroblock in another video frame, a sum of absolute differences is obtained between four fixed elements from one row of a 4×4 macroblock $m_3\ m_2\ m_1\ m_0$, and a streaming row of reference data $r_x \ldots r_4\ r_3\ r_2\ r_1\ r_0$ from the other frame. Typically $r_0, r_1$ etc. and $m_0, m_1$, etc. are unsigned 8-bit binary numbers.

BRIEF SUMMARY

According to a first aspect of the invention, there is provided a logic circuit for digitally processing images wherein the logic circuit is arranged to calculate a sum of absolute differences between a plurality of pixels and the said plurality of members respectively selected successively from all members of a sequence of pixels comprising: first subtractor means having a first input arranged to receive a first of the plurality of pixels; a second input arranged to receive a first member from the sequence and arranged to output a first difference between the said first pixel and first member; second subtractor means having a first input arranged to receive a second pixel of the plurality of pixels; a second input arranged to receive a second member of the sequence and an output arranged to output a second difference between the said second pixel and second member; first adder/subtractor means having a first input zeroed, a second input arranged to receive the first difference, a control input arranged to receive a top bit of the first difference and an output arranged to output a first absolute difference between the first pixel and first member; and second adder/subtractor means having a first input arranged to receive the first absolute difference, a second input arranged to receive the second difference, a control input arranged to receive a top bit of the second difference and an output arranged to output a sum of the absolute difference of the first pixel and first member and the absolute difference of the second pixel and second member.

Conveniently, the logic circuit further comprises an input register electrically connected to the first input of the first subtractor means and the first input of the second subtractor means for inputting the first and second pixels of the plurality of pixels.

Advantageously, the logic circuit further comprises first and second registers electrically connected to the second inputs of the first and second subtracting means respectively, for inputting the first and second members of the sequence.

Conveniently, the logic circuit further comprises first and second intermediate registers having inputs electrically connected to outputs of the first and second subtracting means respectively and outputs electrically connected to second inputs of the first and second adder/subtractor means respectively.

Advantageously, the logic circuit further comprises first and second output registers electrically connected to outputs of the first and second adder/subtractor means respectively.

Advantageously, the logic circuit is arranged to calculate a sum of absolute differences of four pixels from four members successively selected from a sequence of pixels respectively, further comprising: third subtractor means having a first input arranged to receive a third pixel from the plurality of pixels; a second input arranged to receive a third member from the sequence and arranged to output a third difference between the said third pixel and third member; fourth subtractor means having a first input arranged to receive a fourth pixel of the plurality of pixels; a second input arranged to receive a fourth member of the sequence and an output arranged to output a fourth difference between the said fourth pixel and fourth member; third adder/subtractor means having a first input arranged to receive the sum of the first and second absolute differences, a second input arranged to receive the third difference, a control input arranged to receive a copy of a top bit of the third difference and an output arranged to output the sum of the first, second and third absolute differences; and fourth adder/subtractor means having a first input arranged to receive the sum of the first, second and third absolute differences, a second input arranged to receive the fourth difference, a control input arranged to receive a copy of a top bit of the fourth difference and an output arranged to output the sum of the first, second, third and fourth absolute differences.

Conveniently the logic circuit has further corresponding stages for comparing and summing greater pluralities of pixels.

Conveniently, the logic circuit is arranged for determining a motion vector for video signal compression.

Conveniently, the logic circuit is arranged such that once initial latency is passed, a result is produced on every clock cycle.

According to a second aspect of the invention, there is provided a method of digitally processing images arranged to calculate a sum of absolute differences between a plurality of pixels and the said plurality of members respectively selected successively from all members of a sequence of pixels comprising: receiving a first of the plurality of pixels at a first input of first subtractor means; receiving a first member from the sequence at a second input of the first subtractor means and outputting a first difference between the said first pixel and first member; receiving a second pixel of the plurality of pixels at a first input of second subtractor means; receiving a second member of the sequence at a second input of the second subtractor means and outputting a second difference between the said second pixel and second member; receive the first difference at a second input of first adder/subtractor means having a first input zeroed, receiving a top bit of the first difference at a control input of the first adder/subtractor means and outputting a first absolute difference between the first pixel and first member; and receiving the first absolute difference at a first input of second adder/subtractor means, receiving the second difference at a second input of the second adder/subtractor means, receiving a top bit of the second difference at a control input of the second adder/subtractor means and outputting a sum of the absolute difference of the first pixel and first member and the absolute difference of the second pixel and second member.

Conveniently the method further comprises inputting the first and second pixels of the plurality of pixels from an input register electrically connected to the first input of the first subtractor means and the first input of the second subtractor.

Advantageously, the method further comprises inputting the first and second members of the sequence from first and second registers electrically connected to the second inputs of the first and second subtracting means.

Conveniently the method further comprises outputting from the first and second subtracting means respectively to first and second intermediate registers and outputting from the first and second intermediate registers respectively to second inputs of the first and second adder/subtractor means respectively.

Advantageously, the method further comprises outputting from the first and second adder/subtractor means to first and second output registers respectively.

Advantageously the method is arranged to calculate a sum of absolute differences of four pixels from four members successively selected from a sequence of pixels respectively, further comprising: receiving a third pixel from the plurality of pixels a first input of third subtractor means; receiving a third member from the sequence at a second input of the third subtractor means and outputting a third difference between the said third pixel and third member; receiving a fourth pixel of the plurality of pixels at a first input of fourth subtractor means; receiving a fourth member of the sequence at a second input of the fourth subtractor means and outputting a fourth difference between the said fourth pixel and fourth member; receiving the sum of the first and second absolute differences at a first input of third adder/subtractor means, receiving the third difference at a second input of the third adder/subtractor means, receiving a copy of a top bit of the third difference at a control input of the third adder/subtractor means and outputting the sum of the first, second and third absolute differences; and receiving the sum of the first, second and third absolute differences at a first input of fourth adder/subtractor means, receiving the fourth difference at a second input of the fourth adder/subtractor means, receiving a copy of a top bit of the fourth difference at a control input of the fourth adder/subtractor means and outputting the sum of the first, second, third and fourth absolute differences.

Conveniently the method has further corresponding steps for comparing and summing greater pluralities of pixels.

Preferably, the method is arranged for determining a motion vector for video signal compression.

Preferably, once initial latency is passed, a result is produced on every clock cycle.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which.

DETAILED DESCRIPTION

Throughout the description, identical reference numerals are used to identify like parts.

Figure 1:
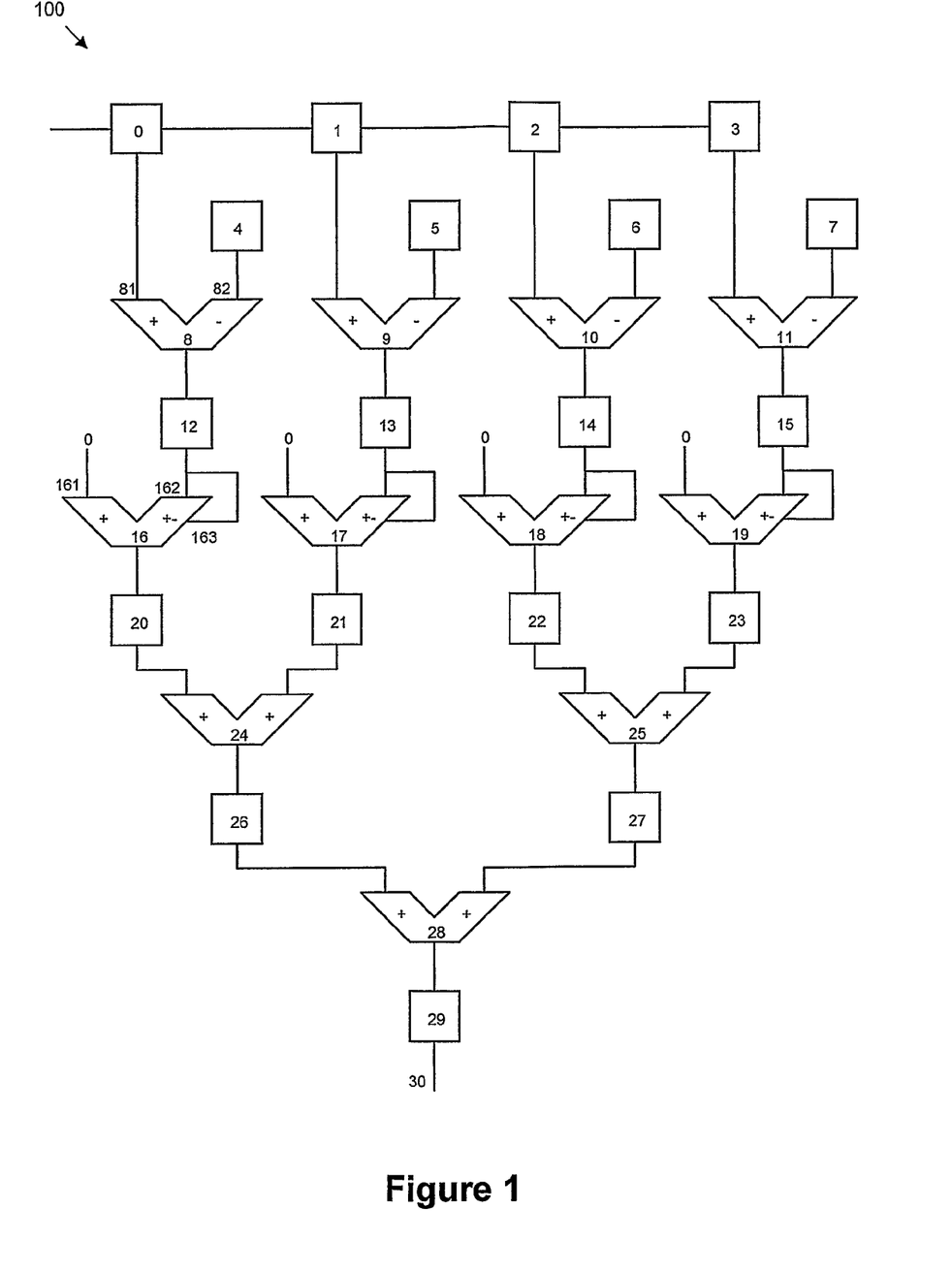
FIG. 1 is a logic circuit for providing a sum of absolute differences using a typical software methodology.

FIG. 1 illustrates a logic circuit 100 to compute a SAD of two sequences using a typical software methodology implemented in hardware. The logic circuit comprises four first registers 0, 1, 2, 3 arranged to form a shift register, and four second registers 4, 5, 6, 7 to hold quasi-constant values.

Outputs of the four first registers 0, 1, 2, 3 are connected to first inputs 81 of four subtraction circuits 8, 9, 10, 11 respectively and outputs of the second registers 4, 5, 6, 7 are connected to second inputs 82 of the subtraction circuits 8, 9, 10, 11 respectively. The subtraction circuits 8, 9, 10, 11 are arranged to subtract a number output from the first second register 4 from a number output from a first of the first registers 0, an output from a second of the second registers 5 from an output from second first register 1, etc, respectively storing the results in four third registers 12, 13, 14, 15, respectively. The output of these third registers are fed to four controlled add/subtract circuits 16, 17, 18, 19, respectively, which add the inputs if a control input (163 for 16, not labelled for the others) is 0, and subtract the inputs otherwise. A copy of top bits of the third registers 12, 13, 14, 15, which represent the sign of a number held therein, are input to the respective add/subtract control input 163, all the bits being passed to second inputs 162 of the controlled add/subtract circuits. A first input 161 of each controlled add/subtract circuit is held at 0. Outputs of each of the four controlled add/subtract circuits 16, 17, 18, 19 are passed to four fourth registers 20, 21, 22, 23, respectively. The outputs of first fourth register 20 and second fourth register 21 are connected through a first adder 24 to a first fifth register 26. Similarly, outputs of a third of the fourth registers 22 and a fourth of the fourth registers 23 are passed to a second adder 25 and thence to a second fifth register 27. Outputs of the first fifth register 26 and the second fifth register 27 are passed to a third adder 28 and thence to a final register 29.

Although references have been made to a copy of a top bit being input to add/subtract control inputs, it will be understood that any bit or bits representing a sign of the input number may alternatively be input to the add/subtract control input.

Figure 2:
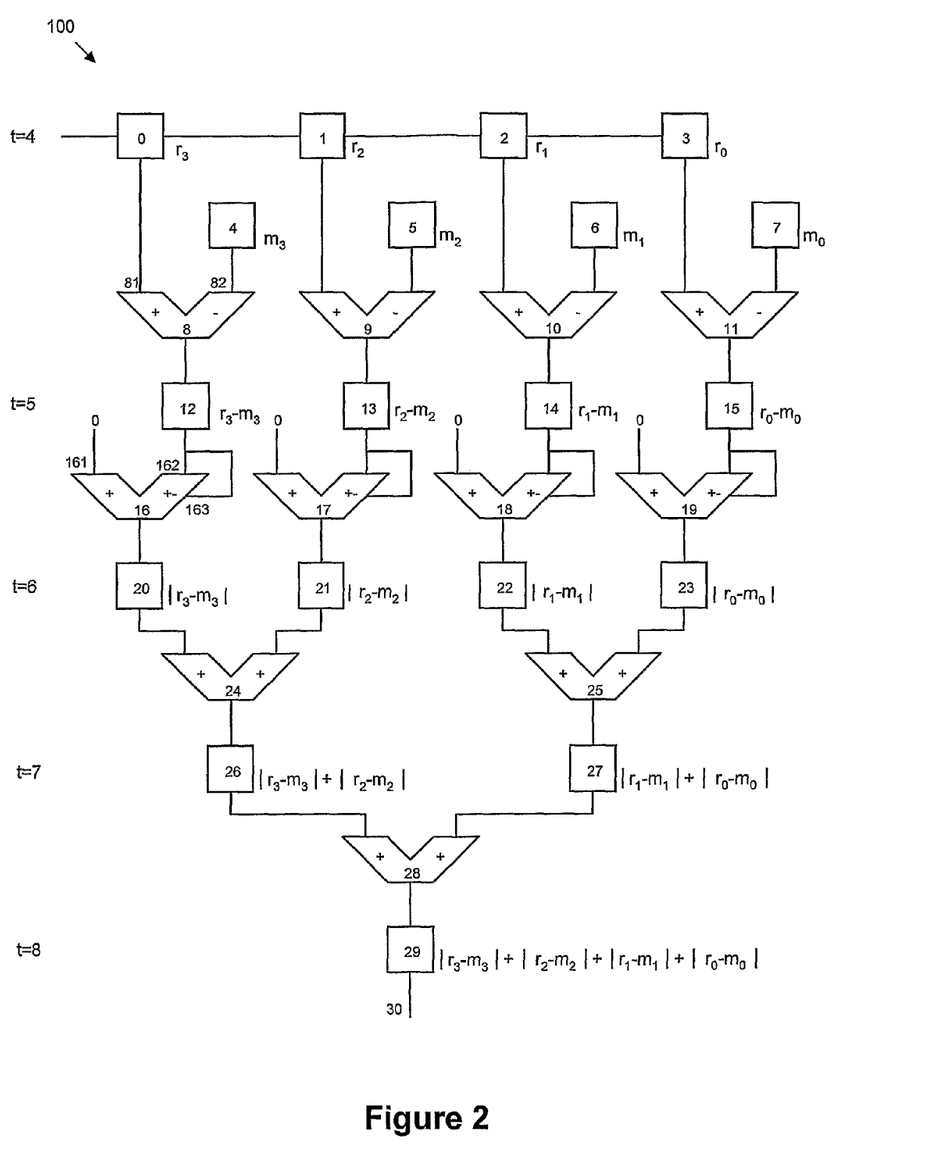
FIG. 2 is the logic circuit of FIG. 1, showing successive contents of registers.

Referring to FIG. 2, the operation of the logic circuit 100 of FIG. 1 is as follows.

On a first clock cycle macroblock second registers 4, 5, 6, 7 contain the macroblock sequence $m_3$, $m_2$, $m_1$, $m_0$, respectively. Reference data $r_0$, is applied at the input to register 0.

On the second clock cycle the data $r_0$ is applied to the input of register 1 and fresh reference data $r_1$ is applied to the input of register 0.

This process continues to the end of the data, clocking in $r_2$, $r_3$, $r_4$ etc.

After four clock cycles, t=4, the register 3 contains $r_0$, register 2 contains $r_1$, register 1 contains $r_2$ and register 0 contains $r_3$. The output of subtractor 11 is $r_0-m_0$, of subtractor 10 is $r_1-m_1$, of subtractor 9 is $r_2-m_2$, and of subtractor 8 is $r_3-m_3$.

On the fifth clock cycle, t=5, these subtraction results are transferred to the third registers 12, 13, 14 and 15, respectively. The output of the first of the third registers 12 will then contain $r_3-m_3$. This is then passed to the second input 162 of the adder/subtractor 16, having its first input 161 held at zero. This adder/subtractor 16 is arranged such that it adds the inputs 161 and 162 if its control input 163 is '1' and subtracts the second input 162 from the first input 161 if the control input 163 is '0'. In 2's complement notation, the top bit of the output of register 12 is '1' if the value is negative, and '0' if positive. Conveniently this means that the output of adder/subtractor 16 is the absolute value of $r_3-m_3$, i.e. modulus $|r_3-m_3|$.

This is registered on the sixth clock cycle, t=6, by the first of the fourth registers 20, similarly $|r_2-m_2|$ is simultaneously registered in the second of the fourth registers 21, $|r_1-m_1|$ in the third of the fourth registers 22 and $|r_0-m_0|$ in the fourth of the fourth registers 23.

On the seventh clock cycle, t=7, the result $|r_3-m_3|+|r_2-m_2|$ is produced from first adder 24 and registered in the first of the fifth registers 26, similarly $|r_1-m_1|+|r_0-m_0|$ is produced from second adder 25 and registered in the second of the fifth registers 27.

On the eighth clock cycle, t=8, the result $|r_3-m_3|+|r_2-m_2|+|r_1-m_1|+|r_0-m_0|$ is produced from third adder 28 and registered in final register 29.

Because of the shifting nature of the input, on the ninth cycle $|r_4-m_3|+|r_3-m_2|+|r_2-m_1|+|r_1-m_0|$ is entered in final register 29.

On the tenth cycle $|r_5-m_3|+|r_4-m_2|+|r_3-m_1|+|r_2-m_0|$ is entered in final register 29, etc. The operation is summarized in the following table.

| | Clock | | | | | | | | |
|---|---|---|---|---|---|---|---|---|---|
| Register | 0 | 1 | 2 | 3 | 4 | 5 | 6 | 7 | 8 |
| 0 | x | $r_0$ | $r_1$ | $r_2$ | $r_3$ | $r_4$ | $r_5$ | $r_6$ | $r_7$ |
| 1 | x | x | $r_0$ | $r_1$ | $r_2$ | $r_3$ | $r_4$ | $r_5$ | $r_6$ |
| 2 | x | x | x | $r_0$ | $r_1$ | $r_2$ | $r_3$ | $r_4$ | $r_5$ |
| 3 | x | x | x | x | $r_0$ | $r_1$ | $r_2$ | $r_3$ | $r_4$ |
| 4 | $m_3$ | $m_3$ | $m_3$ | $m_3$ | $m_3$ | $m_3$ | $m_3$ | $m_3$ | $m_3$ |
| 5 | $m_2$ | $m_2$ | $m_2$ | $m_2$ | $m_2$ | $m_2$ | $m_2$ | $m_2$ | $m_2$ |
| 6 | $m_1$ | $m_1$ | $m_1$ | $m_1$ | $m_1$ | $m_1$ | $m_1$ | $m_1$ | $m_1$ |
| 7 | $m_0$ | $m_0$ | $m_0$ | $m_0$ | $m_0$ | $m_0$ | $m_0$ | $m_0$ | $m_0$ |
| 12 | x | x | $r_0-m_3$ | $r_1-m_3$ | $r_2-m_3$ | $r_3-m_3$ | $r_4-m_3$ | $r_5-m_3$ | $r_6-m_3$ |
| 13 | x | x | x | $r_0-m_2$ | $r_1-m_2$ | $r_2-m_2$ | $r_3-m_2$ | $r_4-m_2$ | $r_5-m_2$ |
| 14 | x | x | x | x | $r_0-m_1$ | $r_1-m_1$ | $r_2-m_1$ | $r_3-m_1$ | $r_4-m_1$ |
| 15 | x | x | x | x | x | $r_0-m_0$ | $r_1-m_0$ | $r_2-m_0$ | $r_3-m_0$ |
| 20 | x | x | x | $|r_0-m_3|$ | $|r_1-m_3|$ | $|r_2-m_3|$ | $|r_3-m_3|$ | $|r_4-m_3|$ | $|r_5-m_3|$ |
| 21 | x | x | x | x | $|r_0-m_2|$ | $|r_1-m_2|$ | $|r_2-m_2|$ | $|r_3-m_2|$ | $|r_4-m_2|$ |
| 22 | x | x | x | x | x | $|r_0-m_1|$ | $|r_1-m_1|$ | $|r_2-m_1|$ | $|r_3-m_1|$ |
| 23 | x | x | x | x | x | x | $|r_0-m_0|$ | $|r_1-m_0|$ | $|r_2-m_0|$ |
| 26 | x | x | x | x | x | $|r_1-m_3|+$ $|r_0-m_2|$ | $|r_2-m_3|+$ $|r_1-m_2|$ | $|r_3-m_3|+$ $|r_2-m_2|$ | $|r_4-m_3|+$ $|r_3-m_2|$ |
| 27 | x | x | x | x | x | x | x | $|r_1-m_1|+$ $|r_0-m_0|$ | $|r_2-m_1|+$ $|r_1-m_0|$ |
| 29 | x | x | x | x | x | x | x | x | $|r_3-m_3|+$ $|r_2-m_2|+$ $|r_1-m_1|+$ $|r_0-m_0|$ |

Figure 3:
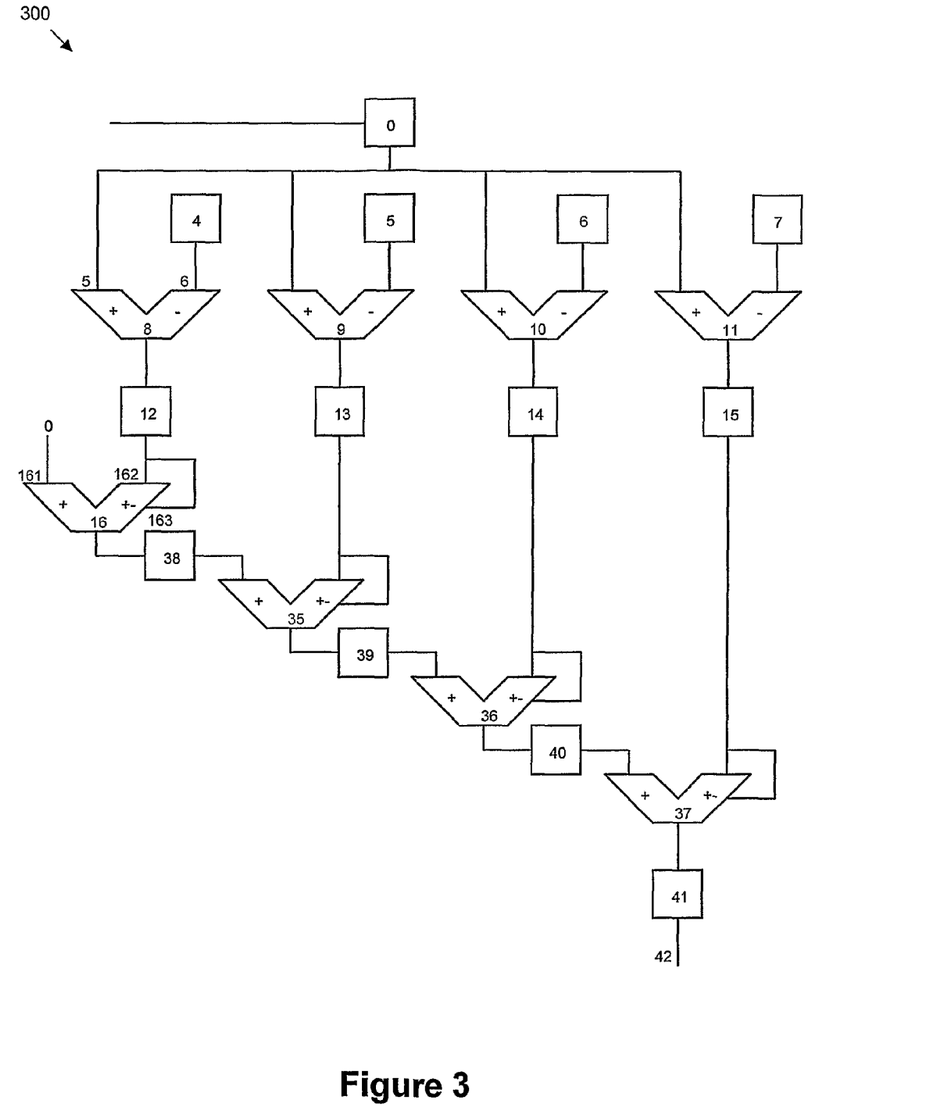
FIG. 3 is a logic circuit according to the invention for providing a sum of absolute differences.

Thus 19 registers are required and the apparatus has a latency of eight clock cycles Referring to FIG. 3, an upper portion, as illustrated, of the logic circuit 300 according to the invention is similar to the logic circuit 100 of FIG. 1. However, there are no registers corresponding to registers 1, 2 and 3 of the shift register of FIG. 1: instead the output of register 0 is connected to first inputs of all four subtraction circuits 8, 9, 10, 11. Second inputs of the four subtraction circuits 8, 9, 10, 11 are driven by second registers 4, 5, 6 and 7, respectively, as in the logic circuit 100 and the outputs of the four subtraction circuits 8, 9, 10, 11 are registered in third registers 12, 13, 14 and 15 respectively. An output of the first of the third registers 12 is connected to a second input 162 of a first add/subtract circuit 16, and the output of the add/subtract circuit 16 is fed to a third register 38. The output of the third register 38 is fed to a + input of a second add/subtract circuit 35, the controlled +− input being driven by an output of the second of the second registers 13. An output of the second add/subtract circuit 35 feeds to a fourth register 39, thence to a third add/subtract circuit 36 having a controlled +− input driven by an output of the third of the second registers 14. An output of the third add/subtract circuit 36 feeds to a fifth register 40, thence to a fourth add/subtract circuit 37 having a controlled +− input driven by an output of the fourth of the second registers 15. An output of the fourth add/subtract circuit 37 feeds a final register 41.

It will be noted that this logic circuit 300 contains only thirteen registers compared with the nineteen of the logic circuit 100 of FIGS. 1 and 2 and contains three fewer adders. It is estimated that a 40% saving in logic cells can be obtained compared with the logic circuit 100 of FIGS. 1 and 2.

Figure 4:
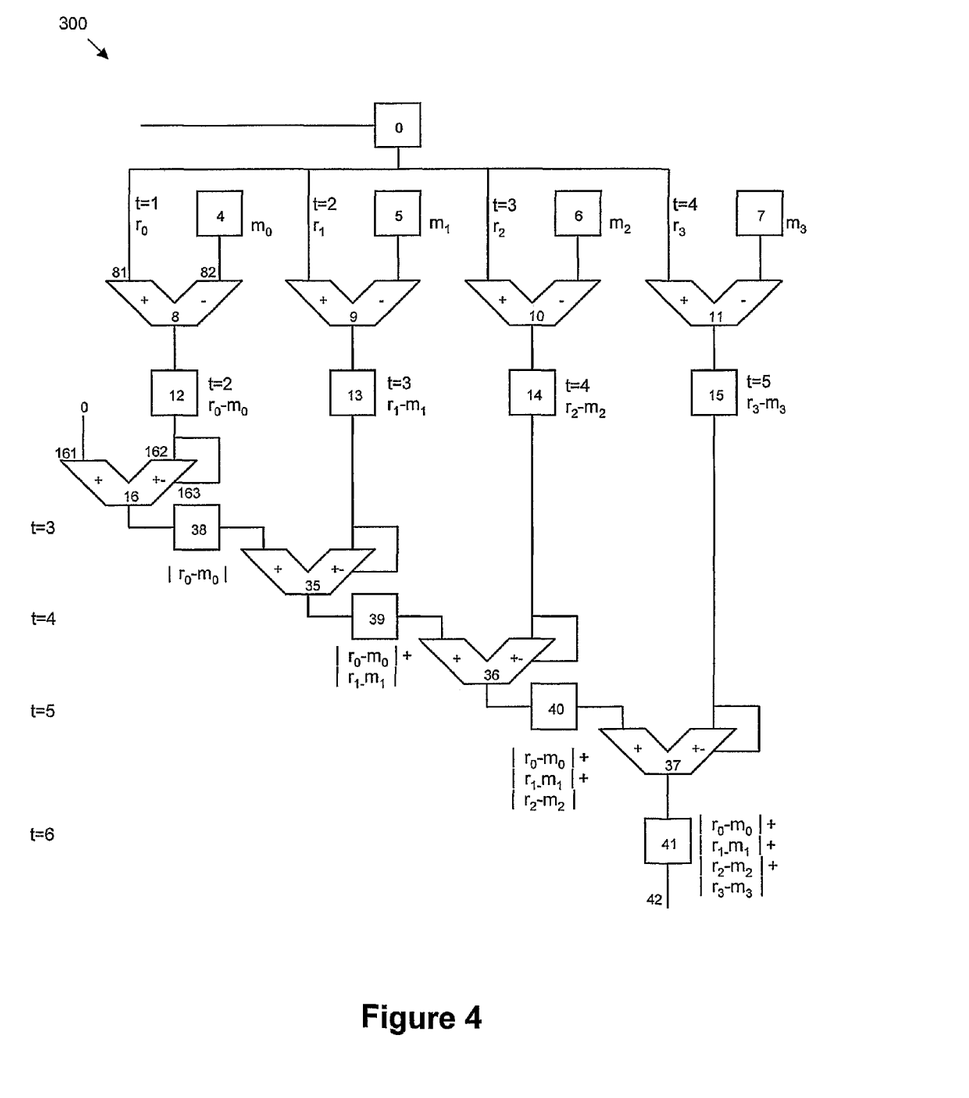
FIG. 4 is the logic circuit of FIG. 3, showing successive contents of registers.
Figure 6:
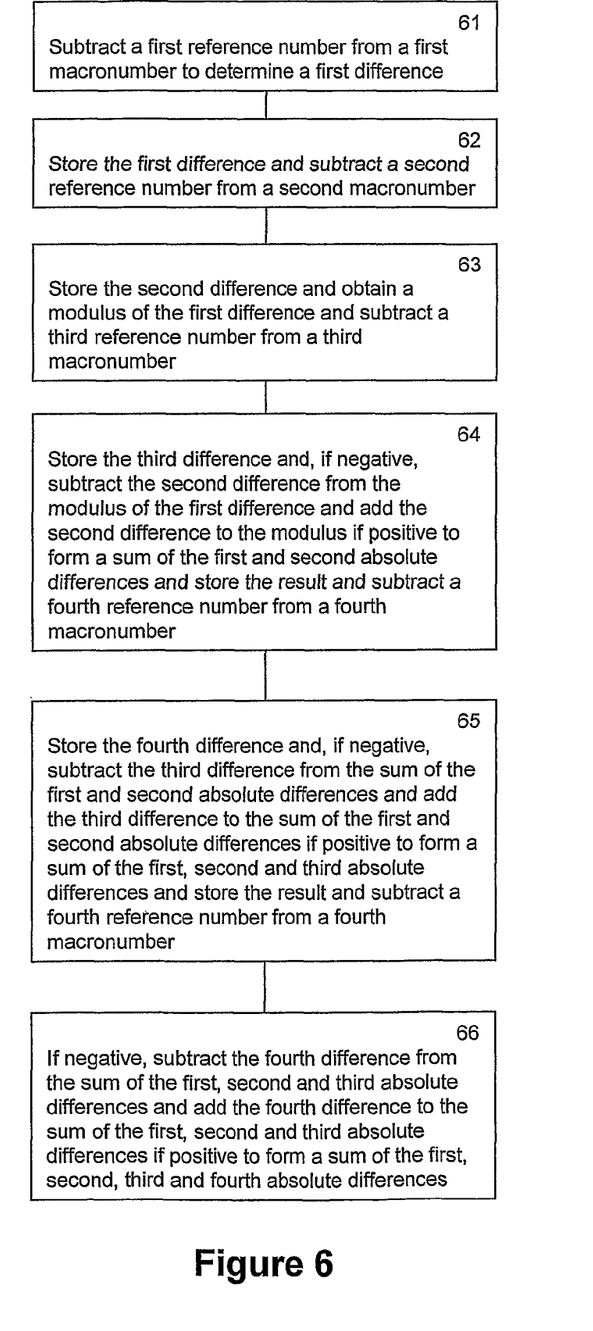
FIG. 6 is a flowchart of a method of determining a sum of absolute differences according to the invention for four pairs of numbers.

Referring to FIGS. 4 and 6, operation of the logic circuit 300 of FIG. 3 is as follows. The input to register 0 is a sequence of data $r_0, r_1, r_2, r_3 \ldots$ as in the prior art, and second registers 4, 5, 6 and 7 contain $m_0, m_1, m_2$, and $m_3$, this is an opposite order to the loading of the corresponding registers of FIGS. 1 and 2.

Following a first clock cycle, step 61, the output of the input register 0 is $r_0$, and following a second cycle, step 62, the values $r_0-m_0, r_0-m_1, r_0-m_2$ and $r_0-m_3$ lie on the third registers 12-15, respectively.

After a third cycle, step 63, t=3, $|r_0-m_0|$ is on the fourth register 38, and $r_1-m_1$ is on the second of the third registers 13.

The second add/subtract circuit 35 adds or subtracts the value of $r_1-m_1$ according to its sign so that after a fourth cycle, step 64, t=4, $|r_0-m_0|+|r_1-m_1|$ is on the fifth register 39, with $r_2-m_2$ on the third of the third registers 14.

After a fifth cycle, step 65, t=5, the sixth register 40 contains $|r_0-m_0|+|r_1-m_1|+|r_2-m_2|$, with $r_3-m_3$ on the fourth of the third registers 15.

After a sixth cycle, step 66, t=6, the output 42 of final register 41 is $|r_0-m_0|+|r_1-m_1|+|r_2-m_2|+|r_3-m_3|$, which is the desired result.

It will be seen that this logic circuit 300 has a latency of 6, two cycles less than the latency 8 of the logic circuit 100 of FIGS. 1 and 2. A subsequent clock cycle produces the shifted data results $|r_1-m_0|+|r_2-m_1|+|r_3-m_2|+|r_4-m_3|$ as before.

The operation is summarized in the following table.

| Reg-ister | Clock | | | | | | |
|---|---|---|---|---|---|---|---|
| | 0 | 1 | 2 | 3 | 4 | 5 | 6 |
| 0 | x | $r_0$ | $r_1$ | $r_2$ | $r_3$ | $r_4$ | $r_5$ |
| 4 | $m_0$ | $m_0$ | $m_0$ | $m_0$ | $m_0$ | $m_0$ | $m_0$ |
| 5 | $m_1$ | $m_1$ | $m_1$ | $m_1$ | $m_1$ | $m_1$ | $m_1$ |
| 6 | $m_2$ | $m_2$ | $m_2$ | $m_2$ | $m_2$ | $m_2$ | $m_2$ |
| 7 | $m_3$ | $m_3$ | $m_3$ | $m_3$ | $m_3$ | $m_3$ | $m_3$ |
| 11 | x | x | $r_0-m_0$ | $r_1-m_0$ | $r_2-m_0$ | $r_3-m_0$ | $r_4-m_0$ |
| 12 | x | x | $r_0-m_1$ | $r_1-m_1$ | $r_2-m_1$ | $r_3-m_1$ | $r_4-m_1$ |
| 13 | x | x | $r_0-m_2$ | $r1-m_2$ | $r_2-m_2$ | $r_3-m_2$ | $r_4-m_2$ |
| 14 | x | x | $r_0-m_3$ | $r1-m_3$ | $r_2-m_3$ | $r_3-m_3$ | $r_4-m_3$ |
| 38 | x | x | x | $|r_0-m_0|$ | $|r_1-m_0|$ | $|r_2-m_0|$ | $|r_3-m_0|$ |
| 39 | x | x | x | x | $|r_0-m_0|+$ $|r_1-m_1|$ | $|r_1-m_0|+$ $|r_2-m_1|$ | $|r_2-m_0|+$ $|r_3-m_1|$ |
| 40 | x | x | x | x | x | $|r_0-m_0|+$ $|r_1-m_1|+$ $|r_2-m_2|$ | $|r_1-m_0|+$ $|r_2-m_1|+$ $|r_3-m_2|$ |
| 41 | x | x | x | x | x | x | $|r_0-m_0|+$ $|r_1-m_1|+$ $|r_2-m_2|+$ $|r_3-m_3|$ |

The method and apparatus is equally applicable to full search and hierarchical search motion estimation (ME) schemes. A hierarchical search ME scheme is one in which the data and macroblock are sub-sampled (via appropriate filtering), a search is performed on this data, and the search results are then refined on a small full resolution area local to the search results. This is a way of achieving improved overall search range for a given amount of ME resource.

The invention reduces an amount of logic required to perform a sum of absolute differences, saving logic resources and latency. The advantages of the reduction in logic resources include:

Cheaper design (smaller footprint, FPGA, etc.)

Less power consumption—a mid-sized FPGA toggling at full rate can consume >15 W. Cooling the chip then becomes a problem with consequential cost implications.

The described embodiment determines a SAD for four pairs of numbers. However, it will be understood that the described circuit is built up of elements of two adders 8, 9 and two subtractor/adders 16, 35, optionally with registers. Hence, the basic element performs the method illustrated in the flow sheet of FIG. 5. It will be understood that the basic element and elemental method may be replicated to determine the SAD of any selected number of pairs of numbers.

The invention also provides the advantage that once the initial latency is over, a result is produced every clock cycle.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although the present invention has been described with reference to preferred embodiments, workers skilled in the art will recognize that changes may be made in form and detail without departing from the spirit and scope of the invention.

I claim:

1. A logic circuit for digitally processing images wherein the logic circuit is arranged to calculate a sum of absolute differences between a plurality of pixels and the same plurality of members respectively selected successively from all members of a sequence of pixels, the logic circuit comprising:

a first subtractor comprising a first input configured to receive a first of the plurality of pixels, and a second input configured to receive a first member from the sequence of pixels, and configured to output a first difference between the first pixel and the first member;

a second subtractor comprising a first input configured to receive a second pixel of the plurality of pixels, a second input configured to receive a second member of the sequence of pixels, and an output configured to output a second difference between the second pixel and the second member;

a first adder/subtractor comprising a first input zeroed, a second input configured to receive the first difference, a control input configured to receive a top bit of the first difference, and an output configured to output a first absolute difference between the first pixel and first member;

a second adder/subtractor comprising a first input configured to receive the first absolute difference, a second input configured to receive the second difference, a control input configured to receive a top bit of the second difference, and an output configured to output a sum of the first absolute difference and the absolute difference of the second pixel and second member;

first and second intermediate registers, each comprising inputs electrically connected to the outputs of the first and second subtractors, respectively, and outputs electrically connected to second inputs of the first and second adder/subtractors, respectively; and wherein the logic circuit is configured such that once initial latency is passed, the logic circuit produces a result on every clock cycle.

2. The logic circuit of claim 1, further comprising an input register electrically connected to the first input of the first subtractor and the first input of the second subtractor, and configured to input the first and second pixels of the plurality of pixels.

3. The logic circuit of claim 2, further comprising first and second registers electrically connected to the second inputs of the first and second subtractors, respectively, and configured to input the first and second members of the sequence of pixels.

4. The logic circuit of claim 1, further comprising first and second output registers electrically connected to the outputs of the first and second adder/subtractors, respectively.

5. The logic circuit of claim 1, further configured to calculate a sum of absolute differences of four pixels from four members successively selected from a sequence of pixels respectively, and further comprising:

a third subtractor comprising a first input configured to receive a third pixel from the plurality of pixels, a second input configured to receive a third member from the sequence of pixels, and an output configured to output a third difference between the third pixel and the third member;

a fourth subtractor comprising a first input configured to receive a fourth pixel of the plurality of pixels, a second input configured to receive a fourth member of the sequence, and an output configured to output a fourth difference between the fourth pixel and the fourth member;

a third adder/subtractor comprising a first input configured to receive the sum of the first and second absolute differences, a second input configured to receive the third difference, a control input configured to receive a copy of a top bit of the third difference, and an output configured to output the sum of the first, second and third absolute differences; and a fourth adder/subtractor comprising a first input configured to receive the sum of the first, second and third absolute differences, a second input configured to receive the fourth difference, a control input configured to receive a copy of a top bit of the fourth difference, and an output configured to output the sum of the first, second, third and fourth absolute differences.

6. The logic circuit of claim 1, further comprising one or more corresponding stages configured to compare and sum additional pluralities of pixels.

7. The logic circuit of claim 1, further configured to determine a motion vector for video signal compression.

8. A method of digitally processing images using a logic circuit arranged to calculate a sum of absolute differences between a plurality of pixels and the same plurality of members respectively selected successively from all members of a sequence of pixels, the method comprising:

receiving a first of the plurality of pixels at a first input of a first subtractor;

receiving a first member from the sequence of pixels at a second input of the first subtractor;

outputting a first difference between the first pixel and the first member;

receiving a second pixel of the plurality of pixels at a first input of second subtractor;

receiving a second member of the sequence at a second input of the second subtractor;

outputting a second difference between the second pixel and the second member;

receiving the first difference at a second input of a first adder/subtractor having a first input zeroed;

receiving a top bit of the first difference at a control input of the first adder/subtractor;

outputting a first absolute difference between the first pixel and first member;

receiving the first absolute difference at a first input of a second adder/subtractor;

receiving the second difference at a second input of the second adder/subtractor;

receiving a top bit of the second difference at a control input of the second adder/subtractor;

outputting a sum of the absolute difference of the first pixel and first member, and the absolute difference of the second pixel and second member;

outputting from the first and second subtractors, respectively, to first and second intermediate registers, and from the first and second intermediate registers, respectively, to second inputs of the first and second adder/subtractors respectively; and producing a result on every clock cycle once an initial latency has passed.

9. The method of claim 8, further comprising inputting the first and second pixels of the plurality of pixels from an input register electrically connected to the first input of the first subtractor and the first input of the second subtractor.

10. The method of claim 8, further comprising inputting the first and second members of the sequence of pixels from first and second registers electrically connected to the second inputs of the first and second subtractors.

11. The method of claim 8, further comprising outputting from the first and second adder/subtractors to first and second output registers, respectively.

12. The method of claim 8, further comprising calculating a sum of absolute differences of four pixels from four members successively selected from a sequence of pixels, respectively, by:

receiving a third pixel from the plurality of pixels at a first input of a third subtractor;

receiving a third member from the sequence of pixels at a second input of the third subtractor;

outputting a third difference between the third pixel and the third member;

receiving a fourth pixel of the plurality of pixels at a first input of a fourth subtractor;

receiving a fourth member of the sequence at a second input of the fourth subtractor;

outputting a fourth difference between the fourth pixel and the fourth member;

receiving the sum of the first and second absolute differences at a first input of a third adder/subtractor;

receiving the third difference at a second input of the third adder/subtractor;

receiving a copy of a top bit of the third difference at a control input of the third adder/subtractor;

outputting the sum of the first, second and third absolute differences;

receiving the sum of the first, second and third absolute differences at a first input of a fourth adder/subtractor;
receiving the fourth difference at a second input of the fourth adder/subtractor;
receiving a copy of a top bit of the fourth difference at a control input of the fourth adder/subtractor; and
outputting the sum of the first, second, third and fourth absolute differences.

13. The method of claim 12, further comprising comparing and summing pluralities of pixels.

14. The method of claim 8, further comprising digitally processing the images to determine a motion vector for video signal compression.

* * * * *

UNITED STATES PATENT AND TRADEMARK OFFICE
CERTIFICATE OF CORRECTION

| | | |
|---|---|---|
| PATENT NO. | : 8,270,478 B2 | Page 1 of 1 |
| APPLICATION NO. | : 12/295457 | |
| DATED | : September 18, 2012 | |
| INVENTOR(S) | : Huggett | |

It is certified that error appears in the above-identified patent and that said Letters Patent is hereby corrected as shown below:

In the Drawing

Figure 5:
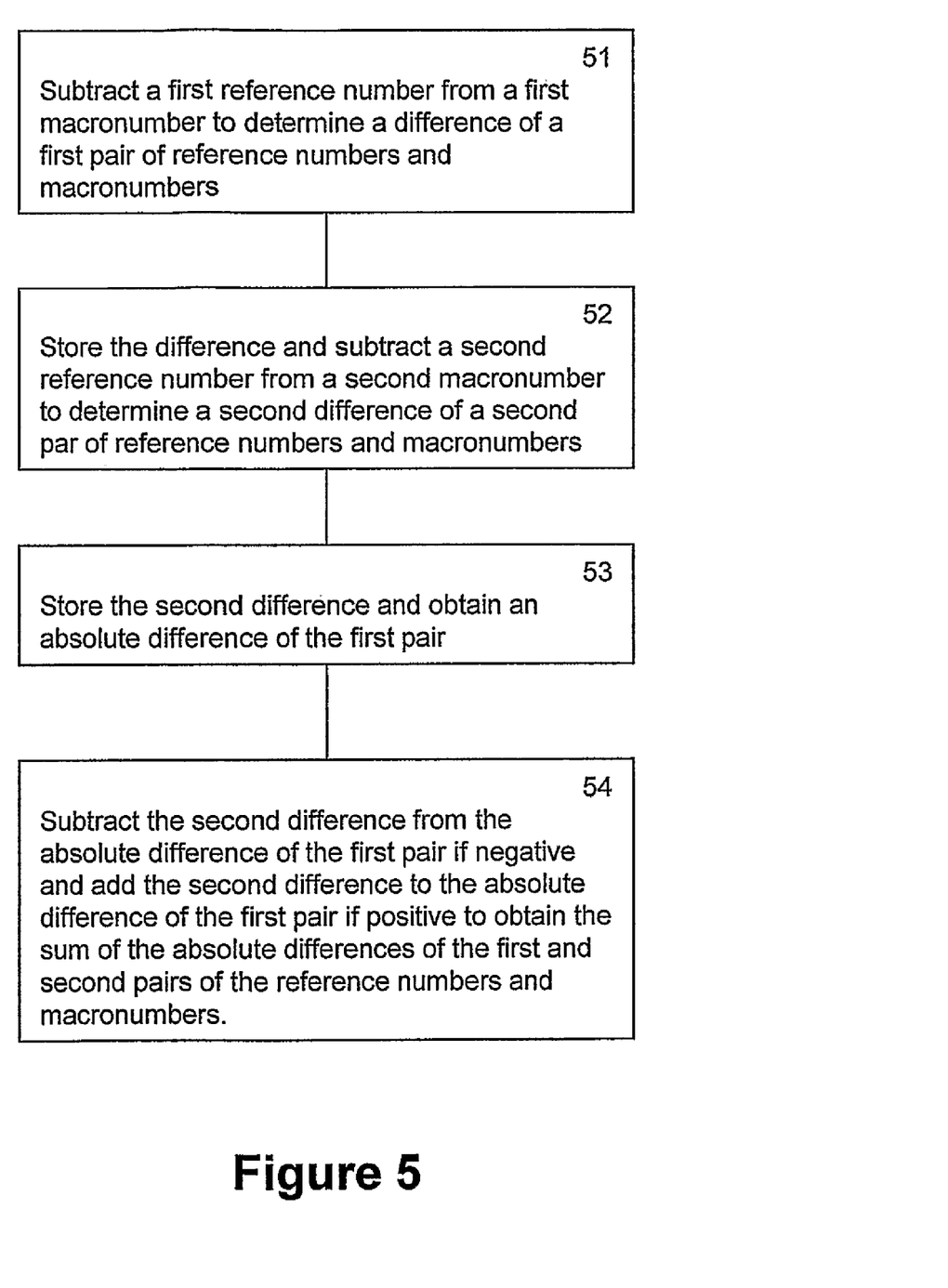
FIG. 5 is a flowchart of a method of determining a sum of absolute differences according to the invention for two pairs of numbers.

In Fig. 5, Drawing Sheet 5 of 6, for Box "52", in Line 4, delete "par" and insert -- pair --, therefor.

Signed and Sealed this
Seventh Day of January, 2014

Margaret A. Focarino
*Commissioner for Patents of the United States Patent and Trademark Office*